B. R. JOLLY.
FLY SWATTER.
APPLICATION FILED OCT. 23, 1919.
1,356,371.
Patented Oct. 19, 1920.
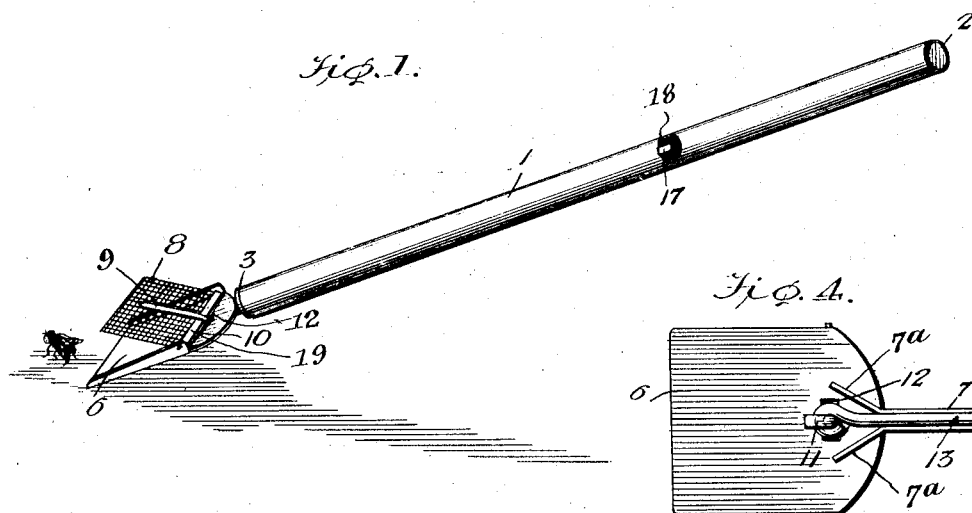
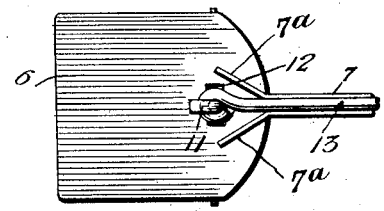
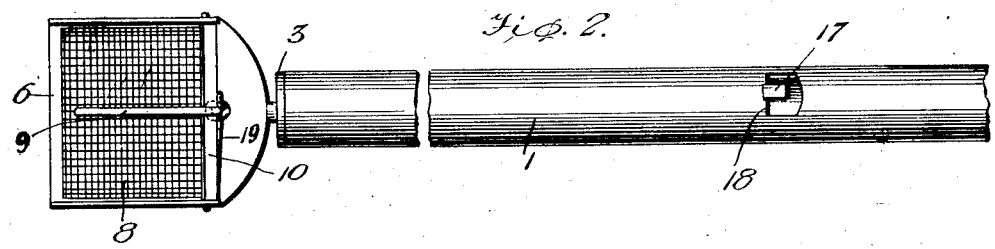
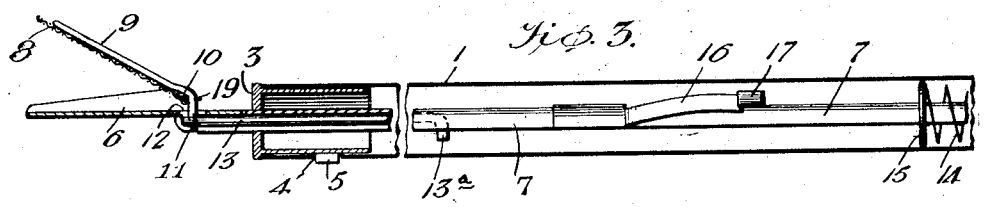
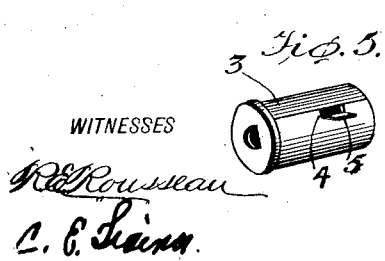
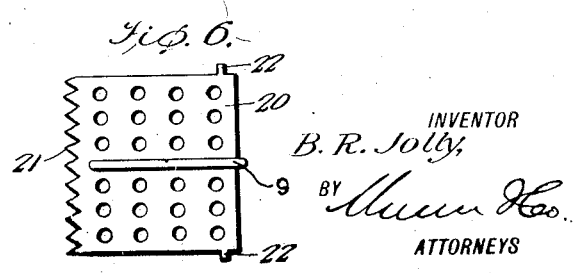
WITNESSES
INVENTOR
B. R. Jolly,
BY
ATTORNEYS

UNITED STATES PATENT OFFICE.

BENJAMIN R. JOLLY, OF RALEIGH, NORTH CAROLINA.

FLY-SWATTER.

1,356,371.  Specification of Letters Patent.  Patented Oct. 19, 1920.

Application filed October 23, 1919. Serial No. 332,760.

*To all whom it may concern:*

Be it known that I, BENJAMIN R. JOLLY, a citizen of the United States, and a resident of Raleigh, in the county of Wake and State of North Carolina, have invented certain new and useful Improvements in Fly-Swatters, of which the following is a specification.

My invention is an improvement in fly swatters, and has for its object to provide a trigger controlled device of the character specified consisting of two leaves mounted to swing toward and from each other to grasp the fly between them, the leaves being supported by a handle and connected to the handle in such manner that when a trigger is released the leaves will be impaled toward the fly and at the end of their movement will be swung together to grasp the fly between them.

In the drawings:

Figure 1 is a perspective view of the improved swatter;

Fig. 2 is a plan view, with a part of the handle broken away;

Fig. 3 is a longitudinal vertical section;

Fig. 4 is a bottom plan view of the fixed leaf;

Fig. 5 is a perspective view of the closing ferrule for the handle;

Fig. 6 is a top plan view of a modified form of movable blade.

In the embodiment of the invention shown in Figs. 1 to 5, inclusive, a handle 1 is provided, of suitable size and of cylindrical form, the said handle being hollow and being closed at one end by a disk 2 and at the other by a cup shaped member or ferrule 3. This cup shaped member, which is closed at its outer end and open at its inner end, is of a size to fit within the handle 1, and the handle which is a split cylinder having its edges brought and held in contact by the resiliency of the cylinder is provided near its lower end with a notch or recess 4 in one edge, which is adapted to be engaged by a radial lug 5 on the ferrule to lock the ferrule in place, it being understood that the lug 5 slips between the edges of the split while it is being placed or removed. Thus by turning the ferrule with respect to the handle it may be withdrawn to permit the disengagement of the supporting mechanism for the leaves, to be described.

The fixed leaf 6 is connected to a shank 7 which is channel shaped and which passes through a central opening in the cup shaped member into the interior of the handle. The leaf or blade 6 is also channel shaped, and the shank and blade in the present instance are integral with each other, having their channels oppositely arranged, however.

Referring to Fig. 4, it will be seen that the side walls of the channel shaped shank 7 diverge at the fixed leaf 6 on each side of the opening 12, as indicated at 7ª.

The movable blade 8, which, in the present instance, is of perforate material, as, for instance, wire mesh, is secured to the body portion 9 of a T-shaped member whose cross portion 10 is provided between the channel walls of the fixed leaf, in such manner that the movable leaf 8 may swing toward and from the fixed leaf. The cross portion 10 of the T-shaped member has a hook 11 which extends through a slot 12 in the fixed leaf, and a link 13 has one end connected with the hook, the said link lying in the channel of the shank 7.

At the end remote from the leaf the link has a laterally extending lug 13ª and this lug is adapted to engage the head or closed end of the cup shaped member when the shank is moved longitudinally in one direction to move the link 13 longitudinally and to swing the movable leaf 8 toward the fixed leaf 6. The shank and the blades are normally pressed away from the handle by a coil spring 14 which encircles the shank between a stop 15 on the shank and the disk 2 before mentioned.

The shank has a spring plate 16 connected therewith at one end of the plate and the other end of the plate has a catch 17 which is adapted to engage the edge of an opening 18 in the tubular handle 1, to hold the shank 7 withdrawn within the casing, that is, in set position.

The stop 15 is a disk of a diameter to slide smoothly in the handle portion 1 and, in addition to its function as a stop, it serves as a guide for guiding the shank. The movable blade is normally pressed away from the fixed blade by a suitable spring indicated at 19. The spring 19 is of angular formation having a portion secured to the fixed leaf 6 near one of the flanges and a portion which extends transversely of the leaf. This portion engages the hook 11 which extends from the slot 12 in the fixed leaf, and acts normally to swing the leaf 8 open.

The operation of the device is as follows:

To set the swatter the shank 7 is pushed into the handle portion 1 until the catch 17 will engage the opening 18. The parts are now held in the position of Fig. 1. The blades are approached toward the fly as shown in Fig. 1, and at the proper point are released by pressing the catch inward. The spring 14 presses the shank quickly out from the handle, carrying with it the two blades in open position. At the moment the lug 13ª engages the end of the handle the leaf 8 is swung sharply toward the blade 6, and the fly is caught between the blades and killed. If the fly is on a plane surface the fixed blade will scoop it up between the blades, while if the fly is in the air it will be caught between the blades and crushed.

In Fig. 6 there is shown a modified form of movable blade. This blade 20 is a perforated blade, having one edge provided with teeth 21 and having near the other edge oppositely extending journal pins 22 for engaging the openings in the side walls of the channel of the fixed collar.

I claim:

1. A fly swatter comprising a handle, a shank movable longitudinally of the handle and extending beyond the handle at one end, said shank carrying a fixed leaf, a movable leaf hinged to the fixed leaf, a link connected with the movable leaf and lying alongside the shank and having a laterally extending lug for engaging the handle when the shank extends beyond the handle a predetermined distance to close the movable leaf on the fixed leaf, a spring for pressing the shank outward, and a releasable catch for holding the shank in inward position.

2. A device of the character specified comprising a handle and a shank normally spring pressed in one direction with respect to the handle, said shank carrying a fixed leaf and a movable leaf, and means controlled by the movement of the shank beyond the handle a predetermined distance for swinging the movable leaf toward the fixed leaf.

3. A device of the character specified comprising a shank carrying a fixed leaf and a movable leaf, normally active means for moving the shank in one direction, means controlled by the movement of the shank beyond a predetermined point for swinging the movable leaf toward the fixed leaf, a handle in which the shank is mounted to move, and a catch for restraining the movement of the shank.

4. A device of the character specified comprising a shank carrying a fixed leaf and a movable leaf, normally active means for moving the shank in one direction, and means controlled by the movement of the shank beyond a predetermined point for swinging the movable leaf toward the fixed leaf.

BENJAMIN R. JOLLY.